May 14, 1940.  H. T. BATTIN  2,200,735
CONTINUOUS VULCANIZING APPARATUS
Filed Feb. 11, 1938    2 Sheets-Sheet 2

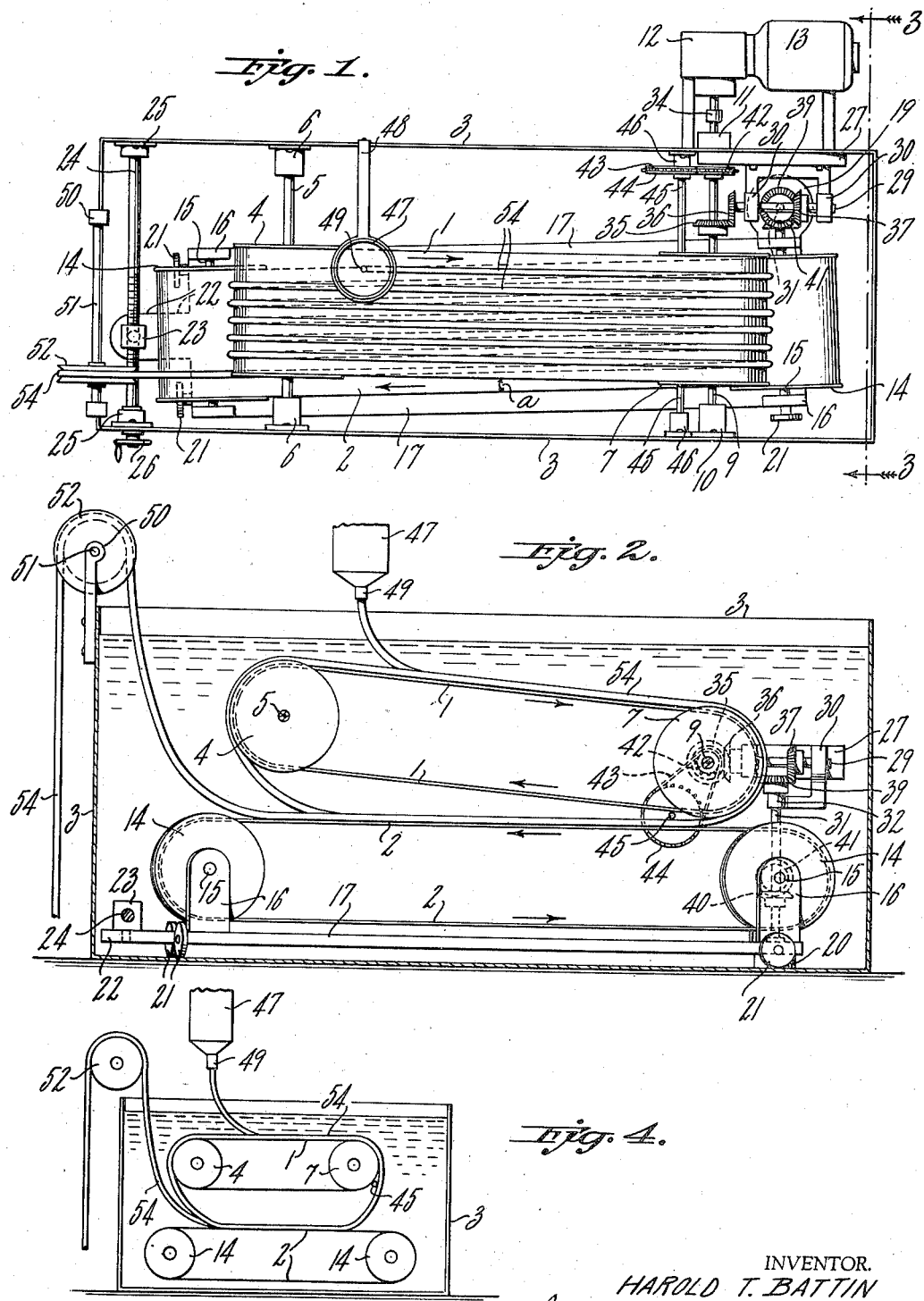

INVENTOR.
HAROLD T. BATTIN
BY Gourley & Budlong
ATTORNEYS

Patented May 14, 1940

2,200,735

UNITED STATES PATENT OFFICE 2,200,735

CONTINUOUS VULCANIZING APPARATUS

Harold T. Battin, Ridgewood, N. J., assignor, by mesne assignments, to United States Rubber Company, New York, N. Y., a corporation of New Jersey Application February 11, 1938, Serial No. 189,953

7 Claims. (Cl. 18—6)

This invention relates to apparatus for conveying continuous material, and more particularly for conveying a continuous length of material in a series of turns within a relatively short space during which the material may be subjected to a treating process.

The invention, while being adapted to use in connection with treating processes in general, is particularly adapted to conveying long continuous lengths of rubber composition within a chamber having a vulcanizing medium which acts upon the length of rubber material during its travel for a long enough period of time to complete vulcanization. More specifically, it is adapted for vulcanizing continuous lengths of cords, tubes, hose, threads, or tapes of rubber which have been formed, as by extrusion, and may be directly introduced onto the apparatus.

When vulcanizing lengths of rubber, particularly continuous lengths of extruded rubber, the rubber is conducted from an extruding nozzle at a rapid rate. As it is of course desirable that the rubber be vulcanized continuously while causing it to travel through a vulcanizing medium at the same rate of travel as that at which it emerges from the nozzle, it is therefore necessary that a considerable length of the extruded rubber be accommodated in the vulcanizing medium. To conduct the rubber in a straight path during vulcanization would necessitate a vulcanizer of impracticably excessive length. Accordingly, vulcanizing drums comprising a plurality of staves or slats have been proposed to economize space, and to rotate successive turns of the rubber within a vulcanizing chamber. The slats in this former apparatus successively engage the rubber strip at regular intervals which under conditions of slight shrinkage may often score or mark the material, resulting in an inferior product. Also with these prior drums, the material is vulcanized while being subjected to a continuous curvature, which curvature the vulcanized product may have a tendency to assume after its ultimate removal from the drum. A drum having a relatively small diameter, while of advantage in space conservation, will subject the rubber material to excessive bending during vulcanization.

The present invention provides an apparatus for conveying continuous lengths of material in a series of turns within a relatively small space and without scoring upon slight shrinkage of the material and without continuous bending or curving. The apparatus comprises generally a pair of endless conveyors, preferably arranged one above the other, and slightly angularly offset with respect to their directions of travel, the angularity between the conveyors being variable to adjust the helical inclination of successive turns as desired, according to the width or thickness of the material or according to the amount of material that is to be conveyed upon the apparatus at a given time. The conveyors travel generally synchronously and in opposite directions so that an extruded length of material may be introduced upon the generally flat upper surface of the upper conveyor, conveyed to the end of the upper conveyor, whence it is introduced, as by the force of gravity, onto the upper surface of the lower conveyor, along the lower conveyor at an angle to its previous line of travel, and returned to the upper conveyor along a line of travel adjacent and parallel to that at which it was first introduced. The path of travel of a point of the material along the upper conveyor is angular to the path of travel back along the lower conveyor so that upon being returned vertically from the lower to the upper conveyor, the point assumes a position laterally adjacent with respect to its original position. Upon being returned to the upper conveyor, the course of travel of a turn of material is repeated to describe generally a helix until the material is finally withdrawn from the side of the apparatus opposite to that at which it was introduced. The apparatus may be provided with vulcanizing means such as a steam, hot water, or hot air container which subjects the material to vulcanization while it is being conveyed. The vulcanization of extremely long lengths of material may thus be effectuated at high speeds of travel within a relatively small space and without damage to the material.

The drawings illustrate certain present preferred embodiments of the apparatus in which:—

Fig. 1 is a plan view of the apparatus mounted within a vulcanizing tank;

Fig. 2 is a side elevational view of the apparatus with a side wall of the tank removed;

Fig. 4 is a simplified side elevational view, with a side wall of the tank removed, of an alternative arrangement of the apparatus.

Figure 3:
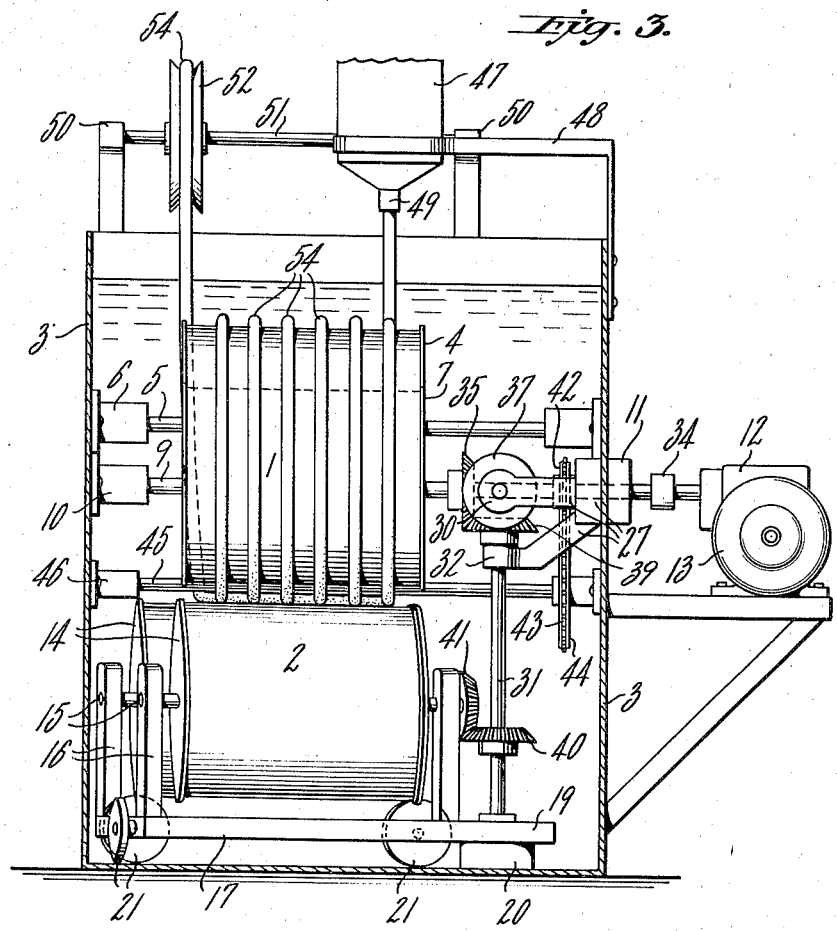
Fig. 3 is an enlarged end cross-sectional view taken along the line 3—3 of Fig. 1, with parts removed.

Referring particularly to Figures 1 and 2, an upper endless belt 1 and a lower endless belt 2 are supported within a vulcanizing tank 3 so that their edges and directions of travel diverge with respect to each other by an acute angle $a$. One end of the upper belt 1 is supported by the pulley 4 rigidly mounted on a shaft 5 rotatably journaled in bearings 6 which are mounted on opposite walls of the tank 3. The other end of the belt 1 is similarly supported by a roll or pulley 7 rigidly mounted on a shaft 9 which is parallel to but lower than the shaft 5. The shaft 9 is rotatably journaled at one end in the bearing 10, and at the other end in the bearing 11 through which it extends to be driven by reduction gearing 12 connected to any suitable driving means 13, such as a motor. The lower belt 2 is supported by rolls or pulleys 14 fixedly mounted on shafts 15 which rotate in brackets 16 which, in turn, are mounted on an angularly movable base 17. The base 17 has at one corner a projecting lug 19 which is pivoted about the axis of a vertical shaft bearing 20 mounted on the bottom wall of the tank 3, as shown in Fig. 3.

Wheels 21 extending from the base 17 at the other three corners movably support the other three corners of the base 17 upon the bottom surface of the tank 3. The left end of the base 17, as viewed in Figures 1 and 2, carries an extending lug 22 above which is pivoted a swivel nut 23 which engages a threaded shaft 24 rotatably journaled in bearings 25 mounted on opposite side walls of the tank 3. One end of the shaft 24 extends through the side wall of the tank and carries a hand crank 26.

In order to drive the belts generally synchronously and in opposite directions, the gearing mechanism is supported by a bracket 27. Referring particularly to Figs. 1 and 3, the bracket 27 supports a horizontal shaft 29 by means of arms carrying bearings 30. A vertical shaft 31 is rotatably supported toward the upper end of a bearing 32 carried by another arm of the bracket 27 and at the lower end by a vertical shaft bearing 20. The shaft 9 is connected to the reducer 12 by a flexible shaft connection 34 and carries a keyed mitre gear 35 which engages a similar gear 36 keyed to and driving the horizontal shaft 29. The shaft 29 carries another mitre gear 37 which engages a similar gear 39 keyed to and driving the vertical shaft 31. The shaft 31 carries a gear 40 which engages a gear 41 keyed to the shaft 15 of the lower pulley 14 to drive the belt 2 generally synchronously with, but in the opposite direction to, the belt 1.

The shaft 9 carries a sprocket 42 which drives, by means of a chain 43, a similar sprocket 44 keyed to a stripping roll 45 which is journaled in bearings 46 supported by the side walls of the tank 3.

An extending device, diagrammatically represented as comprising a reservoir 47 for extrudable material which is supported by bracket 48 extending from the top of one of the side walls of the tank 3 and which carries a nozzle 49, may be suitably mounted above the belt 1 so that material extruded therefrom may fall by gravity upon and be conveyed along by the upper belt 1. Any suitable extruding device as, for example, the conventional horizontal thread or hose nozzle, may be employed, but it is preferable that the extruded material be deposited upon the belt 1 at or near the position indicated in Fig. 1 by any suitable conveying means.

Brackets 50 supported by the top of one end wall of the vulcanizing tank 3 carry a shaft 51 upon which rotates a sheave 52 adjustably positioned along said shaft. The sheave 52 provides means for removing the extruded material 54 from the tank after vulcanization without contact therewith.

Fig. 4 illustrates, somewhat diagrammatically, a different arrangement of the pairs of pulleys 4 and 7, and 14, 14 respectively. In this alternative embodiment of the invention, the pulley 7 is positioned at the same distance from the belt 2 as is the pulley 4, so that the surface plane of belt 1 is parallel to that of the belt 2. It is to be understood, however, that in all embodiments of the invention the belts are relatively disposed to each other at an angle $a$ as shown in Fig. 1.

Figure 5:
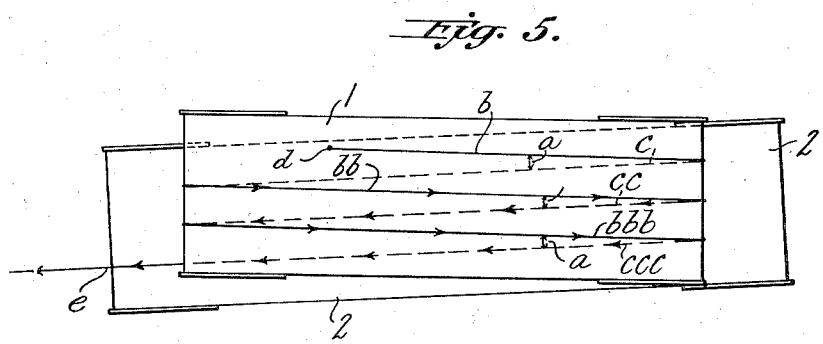
Fig. 5 is a diagrammatic plan view of the apparatus indicating the directions of travel of the material.

Fig. 5 shows the lines of movement $b$, $bb$, and $bbb$ of the material along the belt 1, and corresponding lines $c$, $cc$, and $ccc$ along the belt 2 as the belts travel. This diagram also shows the point $d$ of deposit of the material and the point $e$ of removal. The line $b$ lies in a vertical plane which intersects the vertical plane in which the line $c$ lies, the angle of intersection between those planes being represented by $a$. The acute angle $a$, as shown in Fig. 5 for purposes of illustration, is exaggerated, and may be reduced materially as desired, to handle material of various widths, or to accommodate a desired amount of material on the apparatus. The distance from $b$ to $bb$ represents the amount of lateral progression of a turn of the material in one complete convolution of the apparatus. The ratio of this distance between $b$ and $bb$ to the length of the line $bb$ is substantially the tangent of the angle $a$.

In operation, a continuous length of rubber 53 is extruded from the container 47 by means of the nozzle 49. As it falls upon the belt 1, the rubber is conveyed forwardly in the direction of the uppermost arrow as shown in Figs. 1 and 2, and in the direction of line $b$ (Fig. 5), along the upper planar conveying belt and over the pulley 7 until it drops upon the belt 2 travelling in the opposite direction. In order to prevent the rubber from sticking to the belt, the stripping roller 45 rotates with the belt to insure the deposit of the rubber onto the belt 2. The rubber then progresses on the belt 2 along the line $c$ (Fig. 5) at an angle $a$ with respect to its previous line of travel $b$ on the belt 1 until it approaches the opposite end of the belt 2. It is then returned vertically, onto the upper plane conveying surface of the belt 1 to travel along the line $bb$ adjacent and parallel to its original line of travel thereupon. The rubber then travels again along the upper conveying surface of the belt 1 in a path parallel to its original path and is redeposited by gravity, augmented if necessary by the stripping roller 45, upon the lower belt 2 and then reconveyed by that belt along the next line $cc$ parallel to the preceding line $c$ in Fig. 5. The rubber is thus conveyed generally helically in turns, each turn being adjacent to the preceding turn and spaced therefrom, until it is finally removed from the side of the apparatus opposite to that at which it is introduced. The return of the forward end of the length of rubber from the upper conveying surface of the belt 2 to the upper conveying surface of the belt 1 may be accomplished by hand, but this is necessary only when starting a new length on the apparatus. Once a length of the material has been wound upon the conveying apparatus to cover the conveying surface of the upper belt, the procedure is automatic since each turn follows the path of the preceding turn. The final turn of the rubber is raised from the surface of the belt 2 up over the revolving sheave 52 after vulcanization has taken place. The sheave may be adjusted along the shaft 51 to the proper position for removal of the rubber, whence it may be wound in coils or otherwise allowed to dry, as desired.

When extremely narrow threads or filaments of rubber 53 are extruded, the hand wheel 26 is turned to move the swivel nut 23 and the movable base 17 to a position where the angle $a$ between the belts is reduced so that the belts are more nearly parallel. This allows more turns of the material to be conveyed at one time by the apparatus, and in the case of very fine gauge material there is no danger of contact or overlapping between adjacent turns of the material even when the angle $a$ is only slight. When tape or hose having a greater diameter is to be conveyed and vulcanized, the hand wheel 26 is turned in the opposite direction to increase the angularity between the belts. If less material is to be conveyed by the apparatus, the angle $a$ is increased to enlarge the space between turns, and if more material is to be conveyed, the angle $a$ is decreased. The proper angle may be empirically determined by so adjusting the hand wheel 26 that successive turns of the material lie close to each other without actual contact.

During their generally helical course of travel, successive turns of rubber are vulcanized by any suitable heating means, as shown in Figs. 2 and 3, such as steam, hot air or hot water. When a liquid vulcanizing medium is employed, the tube or hose must obviously have a density greater than the liquid, in order that the rubber material may engage the surface of the belts by gravity. Changes in proportions and positions of the various parts will occur to those skilled in the art, but it is preferable that the pulleys of the lower belt extend beyond those of the upper, so that the material will fall onto and be removed from a moving planar surface. It is obvious that, in order to convey the material generally helically, the line $b$ of movement of a point on the conveyor 1 lies in a vertical plane which intersects the vertical plane containing the line of movement $c$ of a point on the conveyor 2. The apparatus is, of course, not limited to the specifically mentioned means of vulcanizing rubber, and may be employed for subjecting continuous material other than rubber to desired treating processes.

While I have shown and described certain present preferred embodiments of the invention, it is to be understood that the invention is not limited thereto and may be otherwise embodied within the scope of the appended claims.

Having thus described my invention what I claim and desire to protect by Letters Patent is:

1. Apparatus for making a continuous length of vulcanized rubber comprising means for continuously supplying a length of rubber, means for confining a vulcanizing medium, and means for subjecting the length of the rubber to said vulcanizing medium in successive turns comprising an upper endless conveyor having an upper plane material-conveying surface for receiving an upper section of each turn, and a lower endless conveyor having an upper plane material-conveying surface for conveying the lower portion of each turn and travelling in a generally opposite direction from the upper material-conveying surface of the upper conveyor, the principal portion of the upper conveyor being positioned directly above the principal portion of the lower conveyor and the line of movement of a point on one conveyor lying in a vertical plane which intersects at an acute angle the vertical plane containing the line of movement of a point on the other conveyor.

2. Apparatus for making a continuous length of vulcanized rubber comprising means for continuously supplying a length of rubber, means for confining a vulcanizing medium, and means for subjecting the length of the rubber to said vulcanizing medium in successive turns comprising an upper endless conveyor having an upper plane material-conveying surface for receiving an upper section of each turn, a lower endless conveyor having an upper plane material-conveying surface for conveying the lower portion of each turn and travelling in a generally opposite direction from the upper material-conveying surface of the upper conveyor, the principal portion of the upper conveyor being positioned directly above the principal portion of the lower conveyor and the line of movement of a point on one conveyor lying in a vertical plane which intersects at an acute angle the vertical plane containing the line of movement of a point on the other conveyor, and means for varying the angle between said planes.

3. Apparatus for making a continuous length of treated material comprising a nozzle for extruding a length of material, means for confining a treating medium, and means for subjecting the length of the material to said treating medium in successive turns comprising an upper endless conveyor having a plane surface for receiving an upper section of each turn, and a lower endless conveyor having a plane surface for conveying the lower portion of each turn, said plane surfaces travelling in generally opposite directions, the principal portion of the upper conveyor being positioned directly above the principal portion of the lower conveyor and the line of movement of a point on one conveyor lying in a vertical plane which intersects at an acute angle the vertical plane containing the line of movement of a point on the other conveyor.

4. Apparatus for making a continuous length of treated material comprising a nozzle for extruding a length of material, means for confining a treating medium, and means for subjecting the length of the material to said treating medium in successive turns comprising an upper endless conveyor having a plane surface for receiving an upper section of each turn, and a lower endless conveyor having a plane surface for conveying the lower portion of each turn, said plane surfaces travelling in generally opposite directions, the principal portion of the upper conveyor being positioned directly above the principal portion of the lower conveyor and the line of movement of a point on one conveyor lying in a vertical plane which intersects at an acute angle the vertical plane containing the line of movement of a point on the other conveyor, and means for varying the angle between said planes.

5. Apparatus for treating continuous material comprising means for supplying the material, means for containing a treating medium, and means for subjecting successive turns of said material to said treating medium comprising a pair of endless conveyors arranged one above the other, each of said conveyors having at least an upper flat material-conveying surface and moving synchronously in co-operative relation with the other and in opposite direction to the other, the line of movement of a point on one conveyor lying in a vertical plane which intersects at an an acute angle the vertical plane including the line of movement of a point on the other conveyor.

6. Apparatus for treating continuous material comprising means for supplying the material, means for containing a treating medium, and means for subjecting successive turns of said material to said treating medium comprising a pair of endless conveyors arranged one above the other, each of said conveyors having at least an upper flat material-conveying surface and moving synchronously in co-operative relation with the other and in opposite direction to the other, the line of movement of a point on one conveyor lying in a vertical plane which intersects at an acute angle the vertical plane of the line of movement of a point on the other conveyor, and means for varying the angularity between said lines.

7. Apparatus for treating continuous material comprising means for supplying the material, means for containing a treating medium, and means for subjecting successive turns of said material to said treating medium comprising a pair of endless belts arranged in co-operative position one above the other, a pair of pulleys for supporting each belt, means for driving each pair of pulleys in generally synchronous and oppositely directional movement relative to the other, the line of movement of a point on one of the belts lying in a vertical plane which intersects at an acute angle the vertical plane including the line of movement of a point on the other belt.

HAROLD T. BATTIN.